United States Patent
Duer et al.

[11] 3,794,297
[45] Feb. 26, 1974

[54] ROTARY VALVE WITH SEALING STRUCTURE

[75] Inventors: Morris J. Duer, Lansing; William A. Weidman, Okemos, both of Mich.

[73] Assignee: General Motors Corporation, Detroit, Mich.

[22] Filed: Jan. 17, 1973

[21] Appl. No.: 324,524

[52] U.S. Cl.................. 251/309, 251/214, 251/330
[51] Int. Cl. ........................................... F16k 5/02
[58] Field of Search ............ 251/214, 309, 330, 251

[56] References Cited
UNITED STATES PATENTS
1,522,353  1/1925  Whiteman........................ 251/214
2,718,665  9/1955  Clade............................ 251/309 X

*Primary Examiner*—Harold W. Weakley
*Attorney, Agent, or Firm*—Paul Fitzpatrick

[57] ABSTRACT

A valve comprises a housing and a valve member in the housing rotatable between two positions. The valve member has a shaft for rotation projecting through an opening in the housing. Corresponding annular sealing surfaces on the valve member encircling the shaft and on the housing encircling the opening are engageable to prevent escape of fluid through the opening. An arm fixed for rotation with the shaft and engageable with raised external stops on the housing is deformed when engaged with a stop to bias the sealing surfaces into engagement.

2 Claims, 4 Drawing Figures

PATENTED FEB 26 1974  3,794,297

3,794,297

ROTARY VALVE WITH SEALING STRUCTURE

SUMMARY OF THE INVENTION

This invention relates generally to valves and, in particular, to valves suitable for use in engine exhaust systems. In engine exhaust systems, because of the complicated relationships between exhaust emissions, power, economy, ease of starting and other factors, it is often desirable to provide valves to direct the exhaust gases through one of several conduits or devices, depending on engine conditions. A valve designed for use in an exhaust system must have several characteristics. It must be externally actuable; but it must not leak exhaust gases to the atmosphere. It must operate reliably in an environment containing elements that are corrosive and tend to foul its operation. It must not require a large force for operation; and it must be both compact and inexpensive.

The type of valve contemplated for my invention is a rotary valve comprising a generally cylindrical valve member rotatable about its axis in a housing to open or close one or more fluid paths through the housing. It is found that such a rotary valve requires far less force for actuation than most other kinds contemplated. In order that the valve member can be rotated from outside the housing, it is provided with a shaft that extends axially through an opening in the housing. The necessity for an opening in the housing presents the problem of leakage of exhaust gases through this opening. The valve member and housing are therefor provided with corresponding annular sealing surfaces, the one on the housing encircling the opening and the one of the valve member encircling the shaft. These sealing surfaces form parallel or corresponding planes, and one or both of them are raised from the surrounding surface.

The outside of the housing near the opening is provided with a pair of raised stops. An arm, fixed to the shaft, is engageable with either of these stops to locate the valve member in one of its desired positions. In addition, the engagement of the arm with a stop causes one or both of them to be deformed and thus exert an axial force on the valve member toward the housing which brings the sealing surfaces firmly into engagement to help prevent escape of exhaust gases from the valve. When the valve member is rotating from one position to another, however, this axial force is not present; and the sealing surfaces thus present minimal frictional resistance to the rotation.

Further objects and advantages of my invention will be apparent in the following drawings and description.

DESCRIPTION OF THE PREFERRED EMBODIMENT

Figure 1:
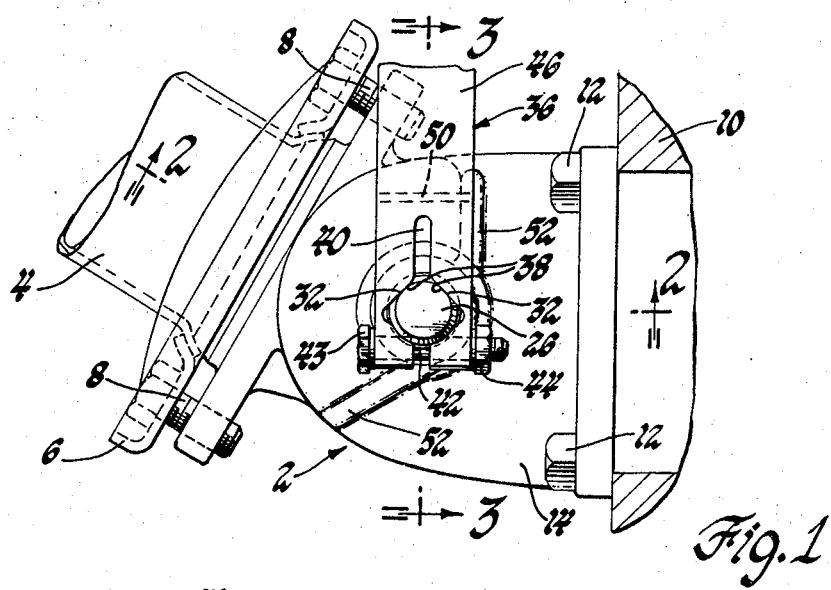
FIG. 1 shows the subject valve viewed along the projecting shaft.

Referring to FIG. 1, a valve 2 is shown coupled between a pipe 4 and a member 10. The pipe 4 is fixed to the valve 2 by retaining ring 6 and bolts 8; and the valve 2 is bolted to the member 10 by bolts 12. Depending on the number of passages within the member 10, the valve 2 can either open or close a single conduit or selectively direct fluid from the pipe 4 into one of two conduits within the member 10.

Figure 2:
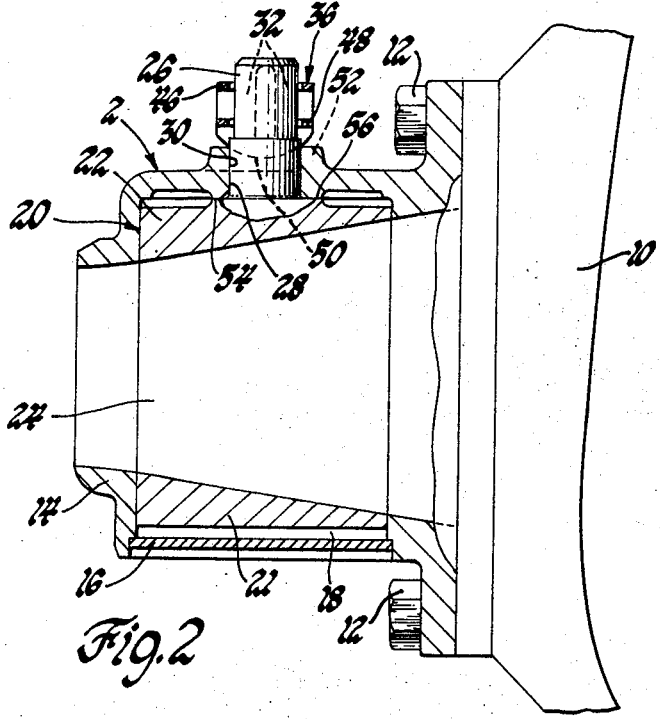
FIG. 2 is a sectional view along line 2—2 in FIG. 1.
Figure 3:
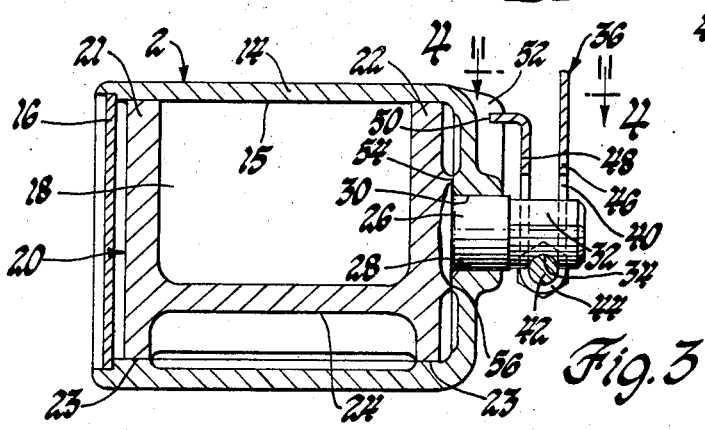
FIG. 3 is a sectional view along line 3—3 in FIG. 1.

Referring to FIGS. 2 and 3, the valve 2 is seen to comprise a housing 14 closed by an end plate 16 and defining a cylindrical chamber 18. A valve member, generally referred to as 20, is positioned rotatably within the chamber 18. The valve member 20 generally comprises a pair of circular disks 21 and 22, one near each axial end of the housing 14, which circular disks 21 and 22 are joined by a conduit closure member 24. A radially outward surface 23 of the valve member 20 forms a section of a cylindrical surface which fits against a similarly cylindrical inner surface 15 of the housing 14. A shaft 26 projects axially from the circular disk 22 outward through an opening 28 formed by another cylindrical inner surface 30 in the closed end of the housing 14. The shaft 26, circular disks 21 and 22 and the inner surface 15 of the housing 14 all have a common axis so that the valve member 20 can be rotated about this axis by the shaft 26 to place the conduit closure member 24 in either of two preselected positions to block or open a conduit. In the case of a valve to choose one of two openings in member 10, the conduit closure member 24, in one position, will block one opening in member 10 and open the other opening in member 10 to the pipe 4, and, in the other position, will block the other opening in member 10 and open the one opening in member 10 to the pipe 4.

The shaft 26 has, near its outer end, a pair of flats 32, which are parallel to the shaft axis and form a convex dihedral angle. Opposite the apex of the angle formed by the flats 32, the shaft has formed therein a transverse groove 34. A metal strap 36 has a hole formed therein which ends, at each end thereof, in a notch with sides 38 leading to a slot 40. As seen in FIG. 1, the angle formed by the sides 38 corresponds closely with the angle formed by the flats 32 of the shaft 26. The metal strap 36 is bent 180° around a bolt 42 and positioned on the shaft 26 so that the bolt 42 lies in the groove 34 and the sides 38 abut the flats 32. A nut 44 is threaded on the bolt 42 so that when the nut 44 is tightened the metal strap 36 is squeezed between the nut 44 and the head 43 of the bolt 42. The existence of the slot 40 allows the sides 38 to be squeezed together by the bolt 42 and nut 44; and this causes the shaft 26, metal strap 36 and bolt 42 to be tightened firmly together. Such apparatus for turning a shaft is described in copending United States application Ser. No. 217,386 filed Sept. 5, 1972, of common ownership with this application.

Figure 4:
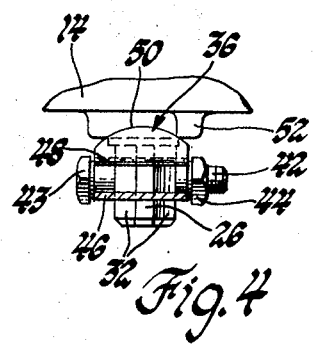
FIG. 4 is a view along line 4—4 in FIG. 3.

The metal strap 36, being bent back on itself 180°, forms two arms, 46 and 48, extending in the same direction. The longer arm 46 is used to cause rotation of the valve member 20. The other arm 48 has its end 50 convexly rounded, as shown in FIG. 4, and bent 90° toward the housing 14, as shown in FIG. 3. Raised stops 52 are formed on the outside of the housing 14; and these stops 52 are engageable by the rounded end 50 of the arm 48 as the shaft 26 is rotated by the arm 46. The arm 48, being formed from the metal strap 36, is deformable in the direction of the arm 46 and becomes so deformed when the rounded end 50 is firmly engaged with the stop 52. Thus the arm 48 also acts as a spring.

An annular portion 54 of the inner surface of the housing 14, which portion 54 encircles the opening 28, is raised and machined flat and smooth in a plane perpendicular to the common axis of the opening 28 and shaft 26. A corresponding annular portion 56 of the outer axial surface of the circular disk 22 from which extends the shaft 26, which portion 56 encircles the shaft 26, is similarly raised and machined flat and smooth in a plane perpendicular to the common axis of the shaft 26 and opening 28. The surfaces 54 and 56 are capable of forming a seal when biased together. It should be apparent that the surfaces 54 and 56 could also be corresponding truncated conical surfaces. The other moving surfaces in contact within the valve, such as the outer surface 23 of the valve member 20 and the cylindrical inner surface 15 of the housing 14 or the outer surface of the shaft 26 and the inner cylindrical surface 30 of the opening 28 in housing 14 do not form tight seals. The valve is so designed not only because of the difficulty of maintaining the tolerances that would be required, but also because such seals would greatly increase the internal friction between the moving members and thus the force necessary to actuate the valve.

In operation, the chamber 18 is filled with exhaust gases under pressure. With the valve member 20 in one of its normal positions the arm 48 is bent by the stop 52 to bias the sealing surfaces 54 and 56 together. Although the total area of the inner surface of disk 22 is subject to the pressure of the exhaust gases, the outer area of the disk 22 radially inward of the sealing surfaces 54 and 56 is subject to atmospheric pressure. A force is thus generated on the valve member 20 which is equal to the product of the difference between exhaust gas pressure in chamber 18 and atmospheric pressure and the area radially inward of the sealing surfaces 54 and 56. This gas pressure is usually greater than atmospheric and the force generated thereby adds to the bias of the arm 48. The bias of arm 48, however, is sufficient to maintain contact between surfaces 54 and 56 if the gas pressure falls below atmospheric.

The valve is actuated by rotation of the valve member 20 with the arm 46 until the end 50 of spring 48 engages the other of the stops 52. During rotation the bias of the arm 48 is absent, thus reducing friction between the sealing surfaces 54 and 56. The valve is self-cleaning and resistant to fouling since all surfaces in contact within the valve slide across each other during actuation, and the shaft 26 need not fit tightly in the opening 30. Because of the low friction, and since no parts have to be moved against exhaust gas pressure, the force required for actuation is small. Any exhaust gas which may escape from the valve 2 during actuation is so small in amount as to be negligible, since the time spent in actuation will be only a minute fraction of the total time of valve use.

We claim:

1. A valve for controlling the flow of fluid comprising, in combination:

a housing defining a chamber, the housing having an opening, a smooth annular sealing surface encircling the opening within the chamber and a pair of raised stops outside the chamber;

a valve member rotatable within the chamber between two positions, the valve member having a shaft projecting outward through the opening for rotation of the valve member and a smooth annular sealing surface encircling the shaft and engageable with the housing sealing surface to prevent leakage of fluid from the chamber through the opening; and an arm fixed to the shaft outside the chamber for rotation with the valve member, the arm being engageable with the stops to define the positions of the valve member, the arm and the stops being so relatively configured as to bias the sealing surfaces into engagement when the arm engages a stop.

2. A valve for controlling the flow of fluid comprising, in combination:

a housing defining a chamber, the housing having an opening, a flat, smooth sealing surface encircling the opening within the chamber and a pair of raised stops outside the chamber;

a valve member rotatable within the chamber between two positions, the valve member having a shaft projecting outward through the opening for rotation of the valve member and a flat, smooth sealing surface encircling the shaft and engageable with the housing sealing surface to prevent leakage of fluid from the chamber through the opening; and an arm fixed to the shaft outside the chamber for rotation with the valve member, the arm being engageable with the stops to define the positions of the valve member, the arm being deformed when engaged with a stop to bias the sealing surfaces into engagement.

* * * * *